US012615403B1

(12) United States Patent
Wong

(10) Patent No.: US 12,615,403 B1
(45) Date of Patent: Apr. 28, 2026

(54) CROSS-FORMAT MEDIA CONSUMPTION TRACKING

(71) Applicant: Disney Enterprises, Inc., Burbank, CA (US)

(72) Inventor: Alan Wong, Astoria, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/933,815

(22) Filed: Oct. 31, 2024

(51) Int. Cl.
*H04N 21/24* (2011.01)
*H04N 21/231* (2011.01)
*H04N 21/258* (2011.01)

(52) U.S. Cl.
CPC ....... *H04N 21/2407* (2013.01); *H04N 21/231* (2013.01); *H04N 21/25866* (2013.01)

(58) Field of Classification Search
CPC ............. H04N 21/2407; H04N 21/231; H04N 21/25866
See application file for complete search history.

(56) References Cited

U.S. PATENT DOCUMENTS 8,301,999 B2 * 10/2012 Olson ................. G06F 16/9577
345/473
2016/0080820 A1 * 3/2016 Lee ....................... H04L 67/306
725/34

* cited by examiner

*Primary Examiner* — Oschta I Montoya

(74) *Attorney, Agent, or Firm* — Farjami & Farjami LLP

(57) ABSTRACT

A system includes a processor and memory storing software code. The processor executes the software code to receive first user data identifying a user and a media content in a first media format accessed by the user, receive second user data suspending access to the media content in the first media format by the user and identifying a first location in the first media format where the access is suspended, and store the first location in a usage history of the user. The software code further receives third user data identifying the user and the media content in a second media format, determines, using the first location and media content metadata cross-referencing the first media format and the second media format, a second location in the second media format corresponding to the first location, and initiates access to the media content in the second media format at the second location.

20 Claims, 6 Drawing Sheets

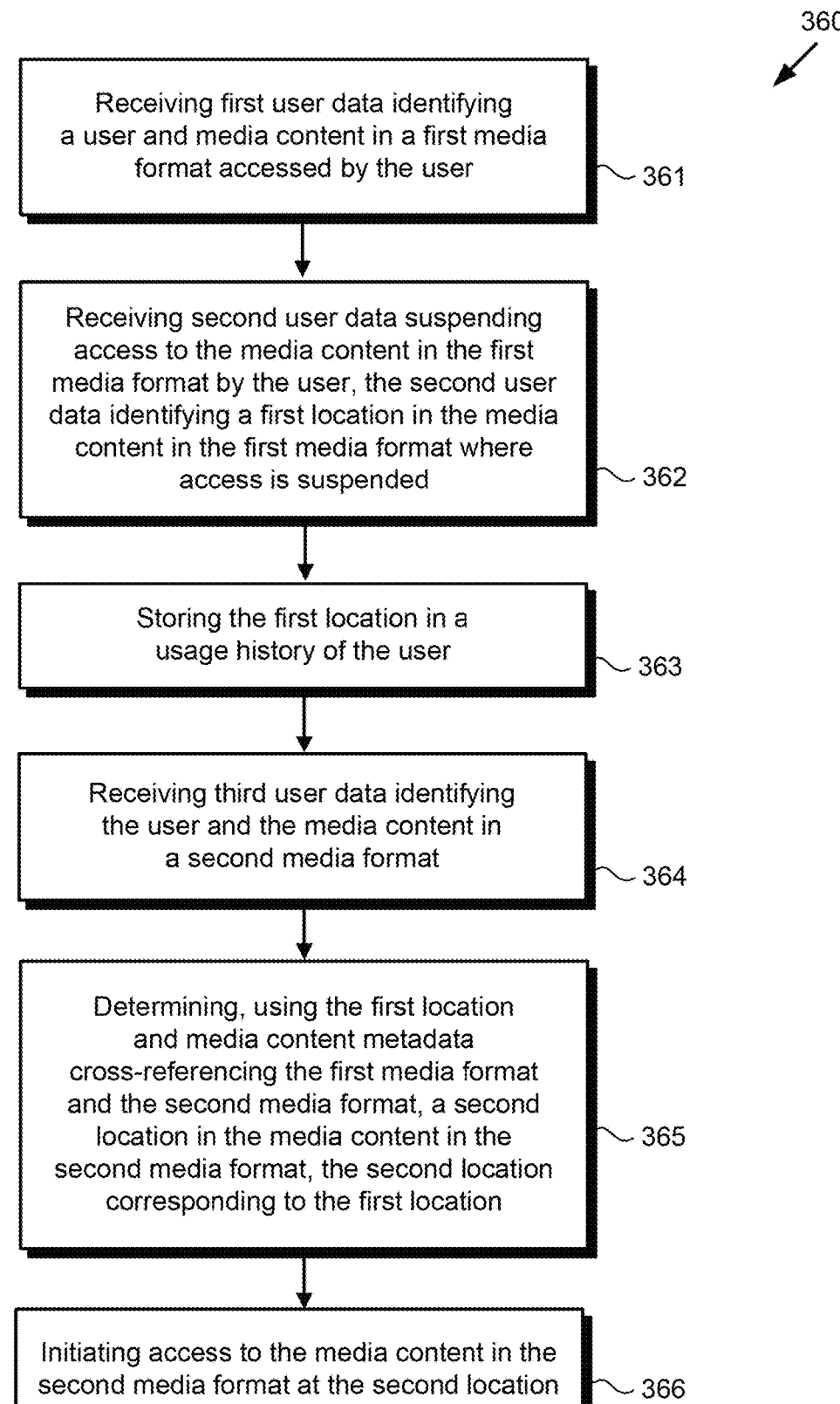

360

Receiving first user data identifying a user and media content in a first media format accessed by the user ~ 361

Receiving second user data suspending access to the media content in the first media format by the user, the second user data identifying a first location in the media content in the first media format where access is suspended ~ 362

Storing the first location in a usage history of the user ~ 363

Receiving third user data identifying the user and the media content in a second media format ~ 364

Determining, using the first location and media content metadata cross-referencing the first media format and the second media format, a second location in the media content in the second media format, the second location corresponding to the first location ~ 365

Initiating access to the media content in the second media format at the second location ~ 366

400

401

| | | | | | | | | | | | | | | |
|---|---|---|---|---|---|---|---|---|---|---|---|---|---|---|
| Story Marker | | | 3 | | | | 4 | | | | | 5 | | |
| Digital Comic Book Page | 1 | 2 | 3 | | | | 4 | | | | | 5 | | |
| Vertical Scrolling Format Image | | | 1 | 2 | 3 | 4 | 5 | 6 | 7 | 8 | 9 | 10 | 11 | 12 |

CROSS-FORMAT MEDIA CONSUMPTION TRACKING

BACKGROUND

Content, such as entertainment content and educational content for example, may be available for consumption in a variety of different media formats, each of which may be more or less desirable depending upon the time, place and circumstances of the media content consumption experience. For example, a comic book or graphic novel may be produced as a digital version of a traditional print format, i.e., a digital comic book or graphic novel having substantially the same layout of pages and panels as a traditional print format, may also be produced in a vertical scrolling format better suited for viewing on a mobile device having a small display screen, and may even be available in video form as a movie or cartoon. A consumer of such content may begin by viewing the digital book or novel at home, may later wish to resume viewing that content using the vertical scrolling format on their mobile phone during a commute, and may subsequently wish to watch the video version of the content starting at the point at which they left off of with the vertical scrolling format, rather than beginning to view the video from the beginning. While there are solutions enabling a consumer of content in a particular media format to seamlessly pause and resume consumption of that content in the same media format, there is presently no way for a consumer to make such seamless transitions across the same content in different media formats.

BRIEF DESCRIPTION OF THE DRAWINGS

Figure 1A:
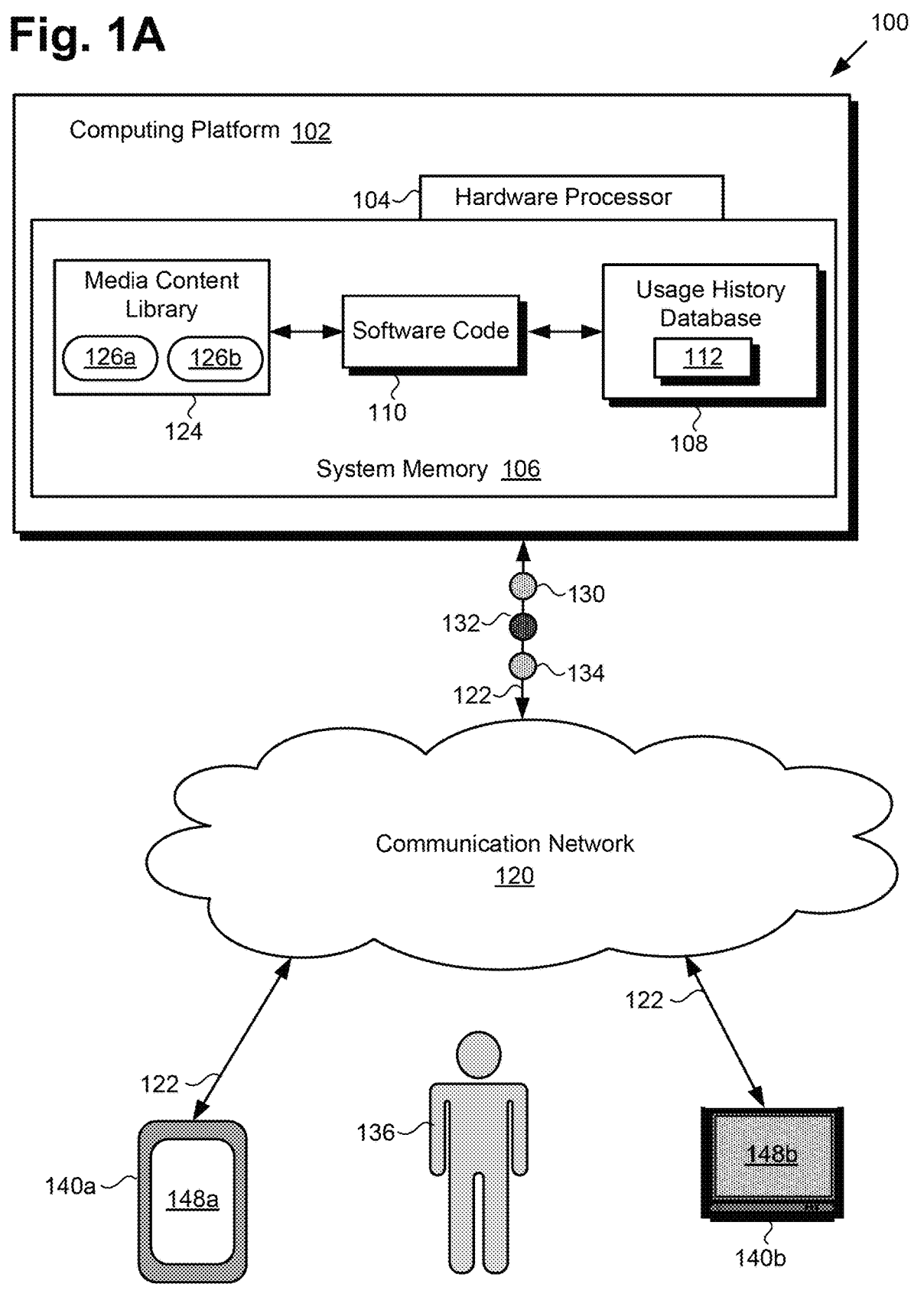

FIG. 1A shows an exemplary system for performing cross-format media consumption tracking, according to one implementation;

FIG. 3 shows a flowchart presenting an exemplary method for performing cross-format media consumption tracking, according to one implementation;

DETAILED DESCRIPTION

Figure 1B:
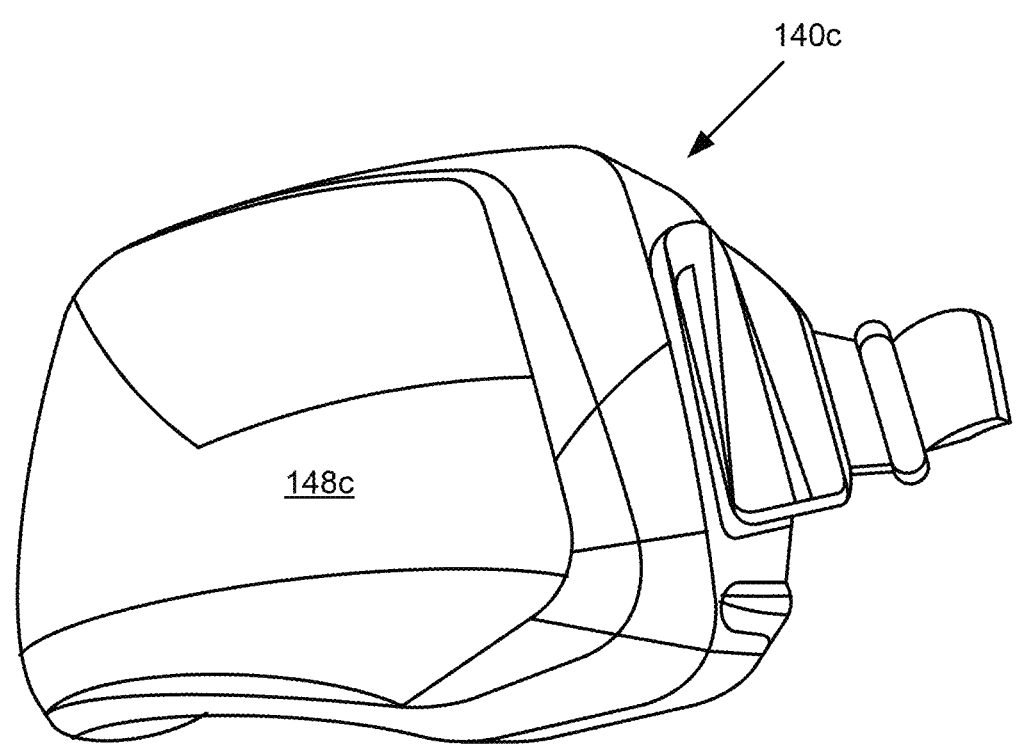
FIG. 1B shows an exemplary user system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, content, such as entertainment content and educational content for example, may be available for consumption in a variety of different media formats, each of which may be more or less desirable depending upon the time, place and circumstances of the media content consumption experience. For example, a comic book or graphic novel may be produced as a digital version of a traditional print format, i.e., a digital comic book or graphic novel having substantially the same layout of pages and panels as a traditional print format, may also be produced in a vertical scrolling format, i.e., a sequence of images presented in a top-down layout restricted only on the sides of a display screen and well suited for viewing on a mobile device having a small display screen, and may even be available in video form as a movie or cartoon. While there are solutions enabling a consumer of content in a particular media format to seamlessly pause and resume consumption of that content in the same media format, there is presently no way for a consumer to make such seamless transitions across the same content in different media formats.

The present application discloses a cross-format media consumption tracking solution that addresses and overcomes the drawbacks and deficiencies in the conventional art. The novel and inventive systems and methods disclosed in the present application advance the state-of-the-art by introducing a solution that uses media content metadata included with media content in each of its various media formats to cross-reference the same or similar locations across the different media formats. Thus, a consumer of a digital comic book, for example, may pause their consumption of the comic book content on a particular page or panel of the comic book, may later resume viewing the comic book content using a vertical scrolling format on a mobile device at an image or set of images in the vertically scrollable stack of images that corresponds to the page or panel of the comic book most recently viewed, and may subsequently view a video version of that content at a timestamp or frame number corresponding to the last image viewed in the vertical scrolling format, and may do so in any order across the different media formats. Moreover, it is noted that the present cross-format media consumption tracking solution can advantageously be implemented as automated systems and methods.

As used in the present application, the terms "automation," "automated" and "automating" refer to systems and processes that do not require the participation of a human system operator. Thus, the methods described in the present application may be performed under the control of hardware processing components of the disclosed automated systems.

FIG. 1A shows exemplary system 100 for performing cross-format media consumption tracking, according to one implementation. As shown in FIG. 1A, system 100 includes computing platform 102 having hardware processor 104 and system memory 106 implemented as a computer-readable non-transitory storage medium. According to the present exemplary implementation, system memory 106 stores software code 110, usage history database 108 and media content library 124.

As further shown in FIG. 1A, system 100 is implemented within a use environment including communication network 120, network communication links 122, user system 140a including display 148a, user system 140b including display 148b and user 136 of user systems 140a and 140b. In addition, FIG. 1A shows media usage history 112 (hereinafter "usage history 112") of user 136, media content 126a in a first media format, and the same media content 126b in a second media format different than the first media format.

Also shown in FIG. 1A are first user data 130 received by system 100 from one of user system 140*a* or user system 140*b*, second user data 132 received by system 100 from the same one of user system 140*a* or user system 140*b* from which first user data 130 is received, and third user data 134 received by system 100 from either user system 140*a* or user system 140*b*.

It is noted that although FIG. 1A depicts media content library 124 storing two versions of the same item of media content 126*a* and 126*b* in different media formats, that representation is merely provided in the interests of clarity. More generally, media content library may store hundreds, thousands, or more, different items of media content, some or all of which may be present in multiple different media formats, such as two media formats, or more than two media formats. Examples of different media formats include, digital books and magazines, digital comic books, digital graphic novels, audio, video including audio (hereinafter "video") and any of various vertical scrolling formats known in the art, to name a few.

It is further noted that, as defined in the present application, the expression "digital comic book" refers to a data file that, when displayed, substantially reproduces the layout of pages and panels found in a physical comic book containing the same content. Moreover, a digital comic book is distinguished from any of a variety of vertical scrolling formats in which comic book or graphic novel panels are substituted for by images arranged sequentially in a vertical stack that are viewed through a scrolling action from the top of the stack, vertically, towards the bottom of the stack. Thus, a page of a digital comic book typically includes multiple panels, each of which corresponds respectively to a single image presented in a vertical scrolling format.

It is also noted that although FIG. 1A depicts usage history database 108 as storing single usage history 112 of user 136, that representation is also merely provided in the interests of conceptual clarity. It is to be understood that multiple users corresponding to user 136 may interact with system 100 contemporaneously or asynchronously, and some or all of such users may have respective usage histories stored in usage history database 108. That is to say, in various implementations, usage history database 108 may store hundreds, thousands, or more, individual usage histories.

Although the present application refers to software code 110, usage history database 108 and media content library 124 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, internal and external hard drives, optical discs, RAM, programmable read-only memory (PROM), erasable PROM (EPROM) and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

Although FIG. 1A depicts software code 110, usage history database 108 and media content library 124 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, one or more of software code 110, usage history database 108 and media content library 124 may be stored remotely from one another on the distributed memory resources of system 100.

Hardware processor 104 may include multiple hardware processing units, such as one or more central processing units, one or more graphics processing units, and one or more tensor processing units, one or more field-programmable gate arrays (FPGAs), custom hardware for machine learning training or inferencing, and an application programming interface (API) server, for example. By way of definition, as used in the present application, the terms "central processing unit" (CPU), "graphics processing unit" (GPU) and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence processes such as machine learning modeling.

In some implementations, computing platform 102 may include one or more web servers, accessible over a packet-switched network such as the Internet, for example. Alternatively, computing platform 102 may include one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in some implementations, communication network 120 may be or include a 10 GigE network or an Infiniband network, for example.

It is noted that, although user system 140*a* is shown as a smartphone or tablet computer in FIG. 1A, while user system 140*b* is shown as a smart television (smart TV) those representations are provided merely by way of example. In other implementations, either of user systems 140a and 140b may take the form of any suitable mobile or stationary computing device or system that implements data processing capabilities sufficient to support a user interface as well as connections to communication network 120, and to perform the functionality ascribed to user systems 140a and 140b herein. That is to say, in other implementations, either of user systems 140a or 140b may take the form of a laptop computer, desktop computer, or game console, to name a few examples. Alternatively, in some implementations, as shown in FIG. 1B, user system 140c corresponding in general to either of user systems 140a and 140b in FIG. 1A may take the form of a wearable communication device, such as an augmented reality (AR) or virtual reality (VR) device including display 148c.

It is also noted that each of displays 148a, 148b and 148c of respective user systems 140a, 140b and 140c may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, displays 148a, 148b and 148c may be physically integrated with respective user systems 140a, 140b and 140c or may be communicatively coupled to but physically separate from respective user systems 140a, 140b and 140c. For example, where any of user systems 140a, 140b, or 140c is implemented as a smartphone, laptop computer, tablet computer, smart TV, or AR or VR device, displays 148a, 148b and 148c will typically be integrated with respective user systems 140a, 140b and 140c. By contrast, where any of user systems 140a, 140b, or 140c is implemented as a desktop computer, displays 148a, 148b and 148c may take the form of a monitor separate from respective user systems 140a, 140b and 140c in the form of a computer tower.

Figure 2:
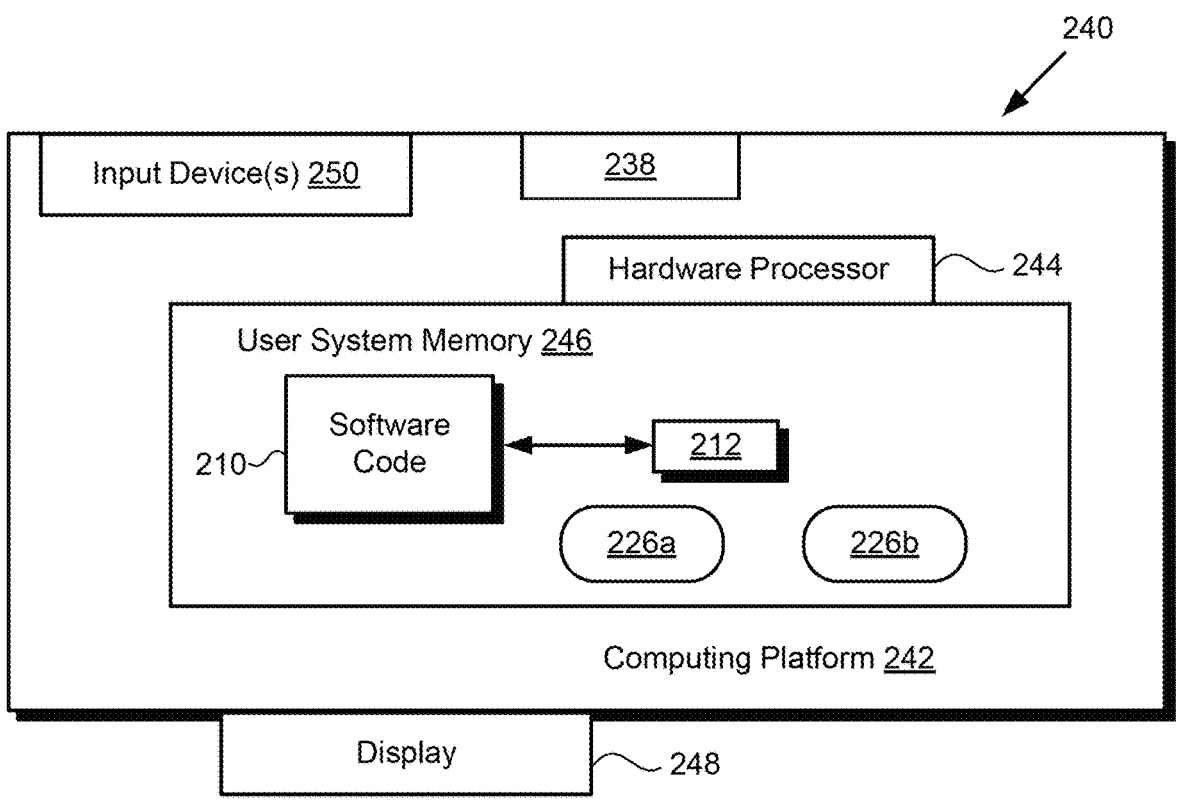
FIG. 2 shows another exemplary system for performing cross-format media consumption tracking, according to one implementation.

FIG. 2 shows another exemplary system, i.e., user system 240, for performing cross-format media consumption tracking, according to one implementation. As shown in FIG. 2, user system 240 includes computing platform 242 having transceiver 238, one or more input devices 250 (hereinafter "input device(s) 250"), hardware processor 244, display 248, and user system memory 246 implemented as a computer-readable non-transitory storage medium storing software code 210, usage history 212, media content 226a in a first media format and the same media content 226b in a second media format different than the first media format.

User system 240 and display 248 correspond respectively in general to any or all of user systems 140a, 140b and 140c and respective displays 148a, 148b and 148c in FIGS. 1A and 1B. Thus, user systems 140a, 140b and 140c and displays 148a, 148b and 148c may share any of the characteristics attributed to user system 240 and display 248 by the present disclosure, and vice versa. For example, like displays 148a, 148b and 148c, display 248 may take the form of an LCD, LED display, OLED display, or QD display. Moreover, although not shown in FIG. 1, each of user systems 140a, 140b and 140c may include features corresponding respectively to computing platform 242, transceiver 238, input device(s) 250, hardware processor 244, and user system memory 246 storing software code 210, usage history 212, media content 226a in a first media format and the same media content 226b in a second media format.

Usage history 212, media content 226a and media content 226b correspond respectively in general to usage history 112, media content 126a and media content 126b, in FIG. 1A. Consequently, usage history 212, media content 226a and media content 226b may share any of the characteristics attributed to respective usage history 112, media content 126a and media content 126b by the present disclosure, and vice versa. Thus, like usage history 112, usage history 212 may be the usage history of user 136 in FIG. 1A.

Transceiver 238 may be implemented as a wireless communication unit configured for use with one or more of a variety of wireless communication protocols. For example, transceiver 238 may include a fourth generation (4G) wireless transceiver, a 5G wireless transceiver, or 4G and 5G wireless transceivers. In addition, or alternatively, transceiver 238 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

Input device(s) 250 may include one or more of a keyboard, mouse, trackpad, touchscreen, infrared or radio-frequency receiver for reception of inputs via a remote control, or a voice activated input device, to name a few examples.

User system hardware processor 244 may include multiple hardware processing units, such as one or more CPUs, one or more GPUs, one or more TPUs, and one or more FPGAS, as those features are defined above.

Software code 210 corresponds in general to software code 110, in FIG. 1A, and can perform all the operations attributed to software code 110 by the present disclosure. In other words, in implementations in which client hardware processor 244 executes software code 210 stored locally in user system memory 246, user system 240 may perform any of the actions attributed to system 100 by the present disclosure. Thus, in some implementations, software code 210 executed by hardware processor 244 of user system 240 may perform cross-format media consumption tracking.

The functionality of system 100, user system 140a/140b/140c/240 and software code 110/210 is further described below by reference to FIG. 3. FIG. 3 shows flowchart 360 presenting an exemplary method for performing cross-format media consumption tracking, according to one implementation. With respect to the actions described in FIG. 3, it is noted that certain details and features have been left out of flowchart 360 in order not to obscure the discussion of the inventive features in the present application.

Referring to FIG. 3 in combination with FIGS. 1A, 1B and 2, flowchart 360 includes receiving first user data 130 identifying user 136 and media content 126a/226a in a first media format accessed by user 136 (action 361). As noted above, the first media format of media content 126a/226a may be, a digital book or magazine, a digital comic book, a digital graphic novel, audio, video, or any of various vertical scrolling formats of a mobile communication device, also known in the art as "infinite scroll."

In some implementations, as shown in FIG. 1A, first user data 130 may be received by system 100, in action 361, from user system 140a or 140b, or from user system 140c in FIG. 1B, via communication network 120 and network communication links 122. In those implementations, first user data 130 may be received in action 361 by software code 110, executed by hardware processor 104 of system 100. Alternatively, and referring to FIGS. 1A, 1B and 2 in combination, in some implementations first user data 130 may be received by user system 140a/140b/140c/240, in action 361, from user 136 via input device(s) 250 of user system 140a/140b/140c/240. In those alternative implementations, first user data 130 may be received in action 361 by software code 210, executed by hardware processor 244 of user system 140*a*/140*b*/140*c*/240.

Continuing to refer to FIG. 3 in combination with FIGS. 1A, 1B and 2, flowchart 360 further includes receiving second user data 132 suspending access to media content 126*a*/226*a* in the first media format by user 136, second user data 132 identifying a first location in media content 126*a*/226*a* in the first media format where the access is suspended (action 362). In use cases in which the first media format of media content 126*a*/226*a* is a digital book, the first location identified in action 362 may be a page of the digital book. Alternatively, in use cases in which the first media format of media content 126*a*/226*a* is a digital comic book or graphical novel, the first location identified in action 362 may be a page or a panel within a page of the digital comic book or graphical novel. As another alternative, in use cases in which the first media format of media content 126*a*/226*a* is a vertical scrolling format, the first location identified in action 362 may be an image or set of images, such as two, three, or four sequential images for example, from a vertical scrolling stack of images. As yet another alternative, in use cases in which the first media format of media content 126*a*/226*a* is audio, the first location identified in action 362 may be a timestamp of the audio, while in use cases in which the first media format of media content 126*a*/226*a* is video, the first location identified in action 362 may be one or both of a timestamp of the video or a frame number of the video.

In some implementations, as shown in FIG. 1A, second user data 132 may be received by system 100, in action 362, from user system 140*a* or 140*b*, or from user system 140*c* in FIG. 1B, via communication network 120 and network communication links 122. In those implementations, second user data 132 may be received in action 362 by software code 110, executed by hardware processor 104 of system 100. Alternatively, and referring to FIGS. 1A, 1B and 2 in combination, in some implementations second user data 132 may be received by user system 140*a*/140*b*/140*c*/240, in action 362, from user 136 via input device(s) 250 of user system 140*a*/140*b*/140*c*/240. In those alternative implementations, second user data 132 may be received in action 362 by software code 210, executed by hardware processor 244 of user system 140*a*/140*b*/140*c*/240.

Continuing to refer to FIG. 3 in combination with FIGS. 1A, 1B and 2, flowchart 360 further includes storing the first location identified by second user data 132 in usage history 112/212 of user 136 (action 363). In some implementations, as shown in FIG. 1A, the first location identified by second user data 132 may be stored in usage history 112 stored in usage history database 108 of system 100. In those implementations, the first location identified by second user data 132 may be stored, in action 363, by software code 110, executed by hardware processor 104 of system 100. Alternatively, and referring to FIGS. 1A, 1B and 2 in combination, in some implementations the first location identified by second user data 132 may be stored in usage history 212 stored in user system memory 246 of user system 140*a*/140*b*/140*c*/240. In those alternative implementations, the first location identified by second user data 132 may be stored, in action 363, by software code 210, executed by hardware processor 244 of user system 140*a*/140*b*/140*c*/240.

Continuing to refer to FIG. 3 in combination with FIGS. 1A, 1B and 2, flowchart 360 further includes receiving third user data 134 identifying user 136 and media content 126*b*/226*b* in a second media format (action 364). As noted above, media content 126*b*/226*b* is the same media content as media content 126*a*/226*a*, but in a different media format. The second media format of media content 126*b*/226*b* may include, a digital book or magazine, a digital comic book, a digital graphic novel, audio content, video, or any of various vertical scrolling formats of a mobile communication device, also known in the art as "infinite scroll."

In some implementations, as shown in FIG. 1A, third user data 134 may be received by system 100, in action 364, from user system 140*a* or 140*b*, or from user system 140*c* in FIG. 1B, via communication network 120 and network communication links 122. In those implementations, third user data 134 may be received in action 364 by software code 110, executed by hardware processor 104 of system 100. Alternatively, and referring to FIGS. 1A, 1B and 2 in combination, in some implementations third user data 134 may be received by user system 140*a*/140*b*/140*c*/240, in action 364, from user 136 via input device(s) 250 of user system 140*a*/140*b*/140*c*/240. In those alternative implementations, third user data 134 may be received in action 364 by software code 210, executed by hardware processor 244 of user system 140*a*/140*b*/140*c*/240.

Continuing to refer to FIG. 3 in combination with FIGS. 1A, 1B and 2, flowchart 360 further includes determining, using the first location identified by second user data 132 and media content metadata included in media content 126*a*/226*a* and media content 126*b*/226*b* cross-referencing the first media format and the second media format, a second location in media content 126*b*/226*b* in the second media format, the second location corresponding to the first location in the first media format identified by second user data 132 received in action 362 (action 365).

The media content metadata included in media content 126*a*/226*a* and media content 126*b*/226*b* cross-referencing the first media format and the second media format may perform that cross-referencing based on a variety of criteria. For example, in some implementations, dialogue or narrative may be cross-referenced from a page or panel of a digital comic book or graphic novel to an image or set of sequential images, such as two, three, or four images for example, from a vertical scrolling stack of image, or to a script of audio content, or to a script of video content, or any combination thereof. Alternatively, or in addition, visual imagery depicting one or more of characters, locations and action may be cross-referenced across different visual media formats, such as digital comic books and graphic novels, vertical scrolling formats for images, and video, for example, using computer vision or other machine learning based identification techniques.

In some implementations, the media content metadata included in media content 126*a*/226*a* and media content 126*b*/226*b* cross-referencing the first media format and the second media format may include story markers that enable the coordination of progression through the content by a user, between formats. By using the structure of a primary format, for example, each additional format can be tagged relative to the primary format using story markers. In the case of digital comic books versus vertical scrolling formats, for example, the start of each grouping of vertical images in the vertical scrolling format may be tagged by a story marker in relation to a page or panel of the digital comic book. This method can analogously be applied to a video, audio book, or non-graphic digital publications.

Depending on the primary format of the content, story markers can have a high level of definition. From pages to panels for comics or scenes to individual dialog in video. The primary format sets the granularity against which the other formats are tagged. For example, in the case of digital comic books versus digital scrolling formats in which the digital comic book is designated as the primary format, the level of granularity against which the images of the vertical scrolling format are tagged may be pages or even individual panels of the digital comic book. The tagged alternate format could then record the index, position, or time in relation to the same point of the story in the primary format. This can be done manually through editing tools or automated systems that can match moments between the formats through image recognition, audio to text, matching copy, or any combination thereof between the formats.

The cross-referencing metadata may be represented as a matrix or other type of data array. As a user progresses through content, their story marker positioning can be saved, relative to the primary format, through a personalization service. Whenever the same content in any format within the same ecosystem is accessed, that presently accessed version of the content can reference the saved story marker and continue at the location where the user most recently left off.

Thus, in use cases in which the second media format of media content 126*b*/226*b* is a digital book, the second location determined in action 365 may be a page of the digital book. Alternatively, in use cases in which the second media format of media content 126*a*/226*b* is ab digital comic book or graphical novel, the second location determined in action 365 may be a page or a panel within a page of the digital comic book or graphical novel. As another alternative, in use cases in which the second media format of media content 126*b*/226*b* is a vertical scrolling format, the second location determined in action 365 may be an image or set of images, such as two, three, or four sequential images for example, from a vertical scrolling stack of images. As yet another alternative, in use cases in which the second media format of media content 126*b*/226*b* is audio, the second location determined in action 365 may be a timestamp of the audio, while in use cases in which the second media format of media content 126*b*/226*b* is video, the second location determined in action 365 may be one or both of a timestamp of the video or a frame number of the video.

In some implementations, the second location in media content 126*b*/226*b* in the second media format that corresponds to the first location in media content 126*a*/226*a* in the first media format may be determined, in action 365, by software code 110, executed by hardware processor 104 of system 100. Alternatively, some implementations, the second location in media content 126*b*/226*b* in the second media format that corresponds to the first location in media content 126*a*/226*a* in the first media format may be determined, in action 365, by software code 210, executed by hardware processor 244 of user system 140*a*/140*b*/140*c*/240.

Continuing to refer to FIGS. 1, 2, and 3A in combination, flowchart 360 further includes initiating access to media content 126*b*/226*b* in the second media format at the second location (action 366). In some implementations, action 366 may be performed by software code 110, executed by hardware processor 104 of system 100. In other implementations, action 366 may be performed by software code 210, executed by hardware processor 244 of user system 140*a*/140*b*/140*c*/240. With respect to the method outlined by flowchart 360, it is noted that, in various implementations, actions 361, 362, 363, 364, 365 and 366 may be performed in an automated process from which human participation may be omitted.

Figure 4A:
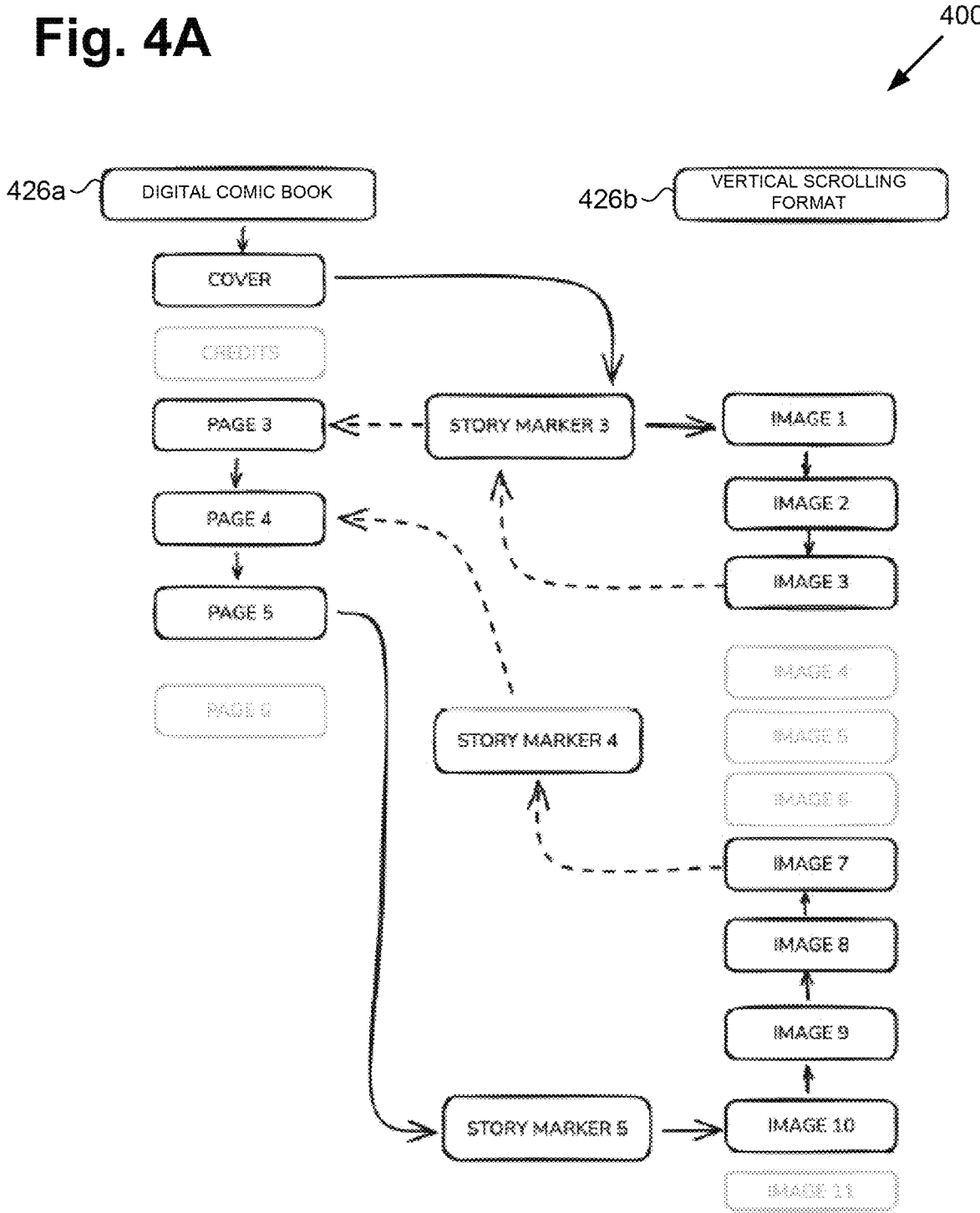
FIG. 4A shows a diagram illustrating cross-format media consumption tracking, according to one implementation.
Figure 4B:
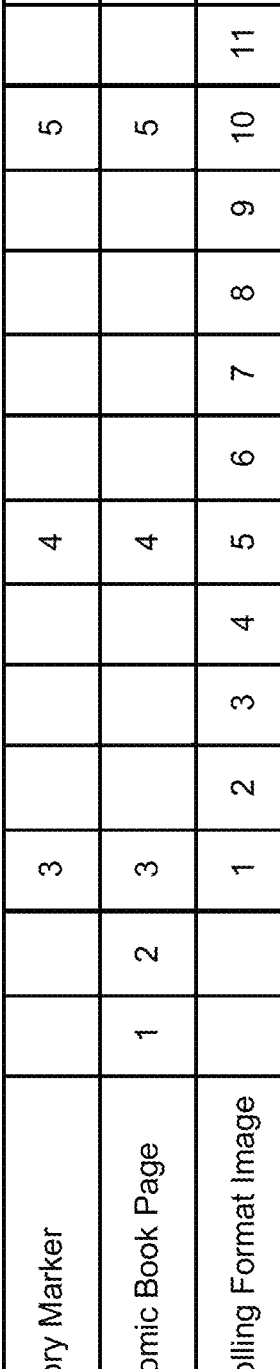
FIG. 4B shows an exemplary metadata array using story markers to cross-reference locations between the same content in two different formats, according to one implementation.

Referring to FIGS. 4A and 4B, FIG. 4A shows diagram 400 illustrating cross-format media consumption tracking, according to one implementation, while FIG. 4B shows exemplary metadata array 401 using story markers to cross-reference locations between the same content in two different formats, according to one implementation. It is noted that the process and metadata array 401 illustrated in FIGS. 4A and 4B are drawn to an exemplary and non-limiting use case in which the first media format of media content 426*a* is a digital comic book and the second media format of media content 426*b* is a vertical scrolling format for individual images. It is further noted that media content 426*a* and media content 426*b* correspond respectively in general to media content 126*a*/226*a* and media content 126*b*/226*b* in FIGS. 1A and 2. Consequently, media content 126*a*/226*a* and media content 126*b*/226*b* may share any of the characteristics attributed to respective media content 426*a* and 426*b* by the present disclosure, and vice versa. It is also noted that the media content consumption process depicted in FIG. 4A may be performed by a user corresponding to user 136, in FIG. 1A.

Referring to FIGS. 1A, 1B, 2 and 3 in combination with FIGS. 4A and 4B, user 136 starts to consume media content 126*a*/226*a*/426*a* as a digital comic book and decides to switch to media content 126*b*/226*b*/426*b* in the vertical scrolling format at the cover page of the digital comic book. The first location is identified as story marker 3 corresponding to page 3 of the digital comic book in action 362 because there was not a previous location set and page 3 is the first page on which comic book content is presented in media content 126*a*/226*a*/426*a*. When the vertical scrolling version of media content 126*b*/226*b*/426*b* loads, the first location in media content 126*a*/226*a*/426*a* is page 3 of the digital comic book. System logic will determine, using the story marker included in the media content metadata, that page 3 of the digital comic book corresponds to image 1 of the vertical scrolling format. User 136 continues to scroll forward (down) to image 3, but stops before an image corresponding to page 4 of the digital comic book is reached, i.e., before reaching story marker 4. User 136 then switches back to the digital comic book and system logic recognizes, using story marker 3, that because image 3 of the vertical scrolling format corresponds to images shown on page 3 of the digital comic book, user 136 returns to the digital comic book at page 3. User 136 moves forward to page 5 of the digital comic book before returning to the vertical scrolling format, at which point system logic recognizes, using story marker 5, that the beginning of page 5 corresponds to image 10 in the vertical scrolling format, which is where the consumption of media content 126*b*/226*b* is resumed. User 136 then scrolls backwards (up) from image 10 to image 7. The system determines, using story marker 4, that user 136 is now viewing an image from page 4 of the digital comic book and when user 136 once again switches back to the digital comic book, access to media content 126*a*/226*a*/426*a* is re-initiated at page 4.

Thus, the present application discloses a cross-format media consumption tracking solution that addresses and overcomes the drawbacks and deficiencies in the conventional art. The novel and inventive systems and methods disclosed in the present application advance the state-of-the-art by introducing a solution that uses media content metadata included with media content in each of its various media formats to cross-reference the same or similar locations across the different media formats. Thus, a consumer of a digital comic book, for example, may pause their consumption of the comic book content on a particular page or panel of the comic book, may later resume viewing the comic book content using a vertical scrolling format on a mobile device at an image or set of images in the vertically scrollable stack of images that corresponds to the page or panel of the comic book most recently viewed, and may subsequently view a video version of that content at a timestamp or frame number corresponding to the last image viewed in the vertical scrolling format, and may do so in any order across the different media formats.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a hardware processor and a system memory storing a software code;

the hardware processor configured to execute the software code to:

receive first user data identifying a user and a media content in a first media format accessed by the user;

receive second user data suspending access to the media content in the first media format by the user, the second user data identifying a first location in the media content in the first media format where the access is suspended;

store the first location in a usage history of the user;

receive third user data identifying the user and the media content in a second media format, wherein the first location in the media content in the first media format corresponds to a plurality of locations in the media content in the second media format;

determine, using the first location and media content metadata cross-referencing the first media format and the second media format, a second location of the plurality of locations in the media content in the second media format; and initiate access to the media content in the second media format at the second location.

2. The system of claim 1, wherein one of the first media format or the second media format is a digital comic book or graphic novel.

3. The system of claim 2, wherein one of the first location or the second location is a page or a panel of the digital comic book or the graphic novel.

4. The system of claim 1, wherein one of the first media format or the second media format is a vertical scrolling format of a mobile communication device.

5. The system of claim 4, wherein one of the first location or the second location is an image included in the vertical scrolling format.

6. The system of claim 1, wherein one of the first media format or the second media format is video.

7. The system of claim 6, wherein one of the first location or the second location is a timestamp or a frame number of the video.

8. A method for use by a system including a hardware processor and a system memory storing a software code, the method comprising:

receiving, by the software code executed by the hardware processor, first user data identifying a user and a media content in a first media format accessed by the user;

receiving, by the software code executed by the hardware processor, second user data suspending access to the media content in the first media format by the user, the second user data identifying a first location in the media content in the first media format where the access is suspended;

storing, by the software code executed by the hardware processor, the first location in a usage history of the user;

receiving, by the software code executed by the hardware processor, third user data identifying the user and the media content in a second media format, wherein the first location in the media content in the first media format corresponds to a plurality of locations in the media content in the second media format;

determining, by the software code executed by the hardware processor, using the first location and media content metadata cross-referencing the first media format and the second media format, a second location of the plurality of locations in the media content in the second media format; and initiating, by the software code executed by the hardware processor, access to the media content in the second media format at the second location.

9. The method of claim 8, wherein one of the first media format or the second media format is a digital comic book or graphic novel.

10. The method of claim 9, wherein one of the first location or the second location is a page or a panel of the digital comic book or the graphic novel.

11. The method of claim 8, wherein one of the first media format or the second media format is a vertical scrolling format of a mobile communication device.

12. The method of claim 11, wherein one of the first location or the second location is an image included in the vertical scrolling format.

13. The method of claim 8, wherein one of the first media format or the second media format is video.

14. The method of claim 13, wherein one of the first location or the second location is a timestamp or a frame number of the video.

15. A computer-readable non-transitory storage medium having stored thereon a software code, which when executed by a hardware processor, instantiates a method comprising:

receiving first user data identifying a user and a media content in a first media format accessed by the user;

receiving second user data suspending access to the media content in the first media format by the user, the second user data identifying a first location in the media content in the first media format where the access is suspended;

storing the first location in a usage history of the user;

receiving third user data identifying the user and the media content in a second media format, wherein the first location in the media content in the first media format corresponds to a plurality of locations in the media content in the second media format;

determining, using the first location and media content metadata cross-referencing the first media format and the second media format, a second location of the plurality of locations in the media content in the second media format; and initiating access to the media content in the second media format at the second location.

16. The computer-readable non-transitory storage medium of claim 15, wherein one of the first media format or the second media format is a digital comic book or graphic novel.

17. The computer-readable non-transitory storage medium of claim 16, wherein one of the first location or the second location is a page or a panel of the digital comic book or the graphic novel.

18. The computer-readable non-transitory storage medium of claim 15, wherein one of the first media format or the second media format is a vertical scrolling format of a mobile communication device.

19. The computer-readable non-transitory storage medium of claim 18, wherein one of the first location or the second location is an image included in the vertical scrolling format.

20. The computer-readable non-transitory storage medium of claim 15, wherein one of the first media format or the second media format is video, and wherein one of the first location or the second location is a timestamp or a frame number of the video.

\* \* \* \* \*